Sept. 2, 1958   R. I. LAPPIN ET AL   2,849,896
MIXER ATTACHMENT
Filed Nov. 14, 1955
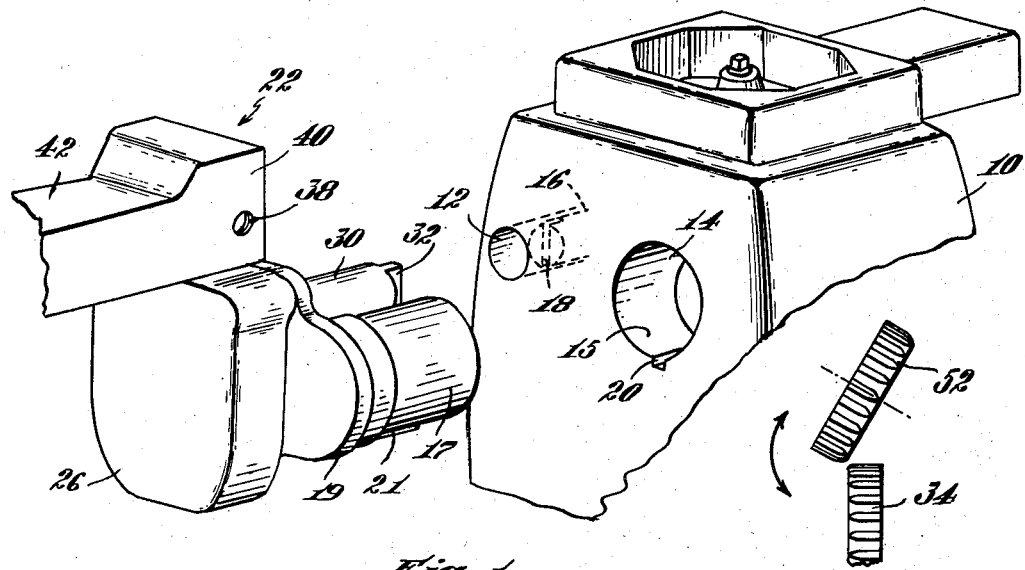
Fig. 1
Fig. 5
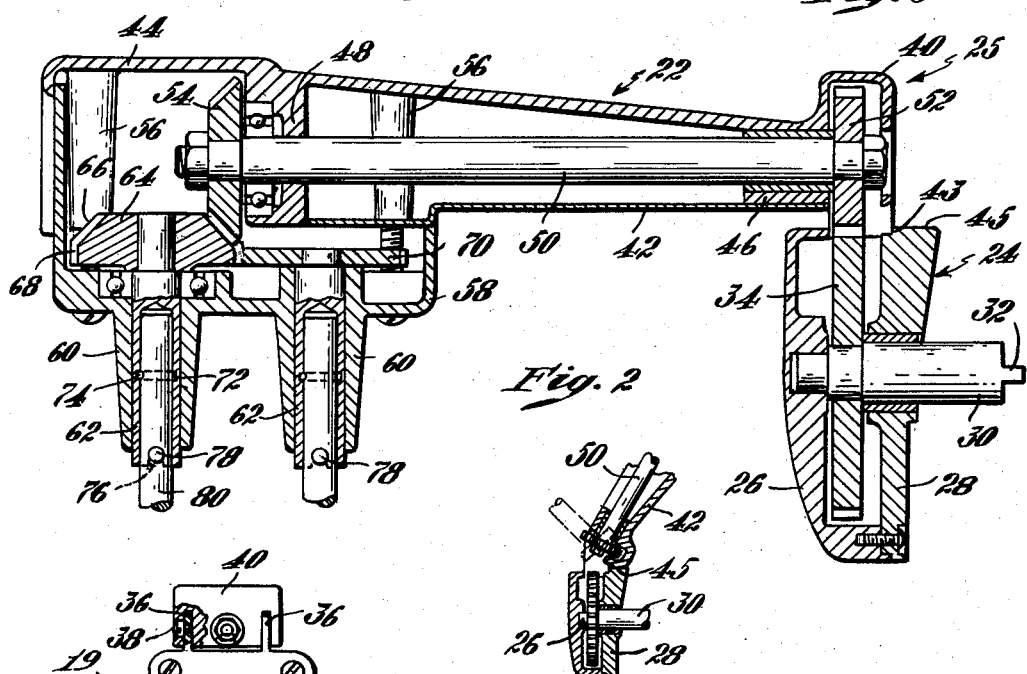
Fig. 2
Fig. 4
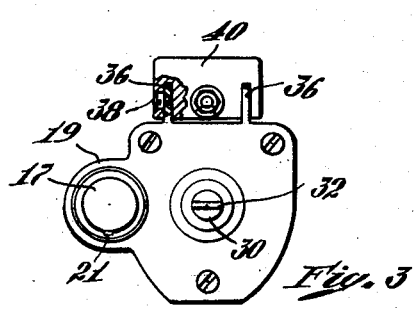
Fig. 3
Inventors
Robert I. Lappin
Louis Zaiger
by Roberts, Cushman & Grover
Attys

United States Patent Office 2,849,896
Patented Sept. 2, 1958

2,849,896

MIXER ATTACHMENT

Robert I. Lappin, Marblehead, and Louis Zaiger, Swampscott, Mass.

Application November 14, 1955, Serial No. 546,531

6 Claims. (Cl. 74—665)

This invention relates to a beater attachment for use with the power unit which forms the subject matter of our pending application for patent "Power Unit for Kitchen Appliances," Serial No. 469,182, filed November 16, 1954.

The principal object of the invention is to provide a driving attachment which may be coupled to one of the power outlets of the aforesaid unit for receiving the shafts of a pair of beaters and driving them. Other objects are to provide an attachment which may be fastened to the unit, quickly and easily, which will not turn on the axis of the driving shaft, which will pivotally support the beaters so that they may be lifted from the bowl and which will automatically bring the beaters to a stop as they are lifted from the bowl so as to avoid splatter. Other objects are to provide an attachment wherein the driving components are contained within an attractive housing which prevents ingress of foodstuffs to the driving mechanism and egress of lubricant to the food being prepared thereby and which is easy to keep clean and attractive in appearance.

As herein illustrated the attachment has articulated parts constituting an attaching bracket and an arm supported thereby in a horizontal position. The bracket carries a coupling element for driving engagement with a power outlet of the unit and the arm carries a pair of beater sockets for receiving the upper ends of beaters. In addition there are means carried by the arm and bracket which may be rendered operable for drivably connecting the beater sockets with the coupling element when the arm occupies a horizontal position and inoperative when the arm is lifted to withdraw the beaters from the bowl. To afford stability and rigidity against twisting the bracket has a laterally spaced boss parallel to the coupling for telescoping engagement within a recess in the unit provided to receive the same. The bracket and arm are preferably hollow and completely enclose the driving mechanism except for the couplings extending from the bracket at one end and the sockets extending from the lower side of arm at the other end. The aforesaid driving mechanism is constituted by a pair of meshing gears fast to the coupling and shaft respectively, a pair of gears fast to the sockets respectively, one of which has a toothed hub associated with it and a gear fast to the shaft meshing with the hub.

The invention will now be described in greater detail with reference to the accompanying drawings, wherein—

Fig. 1 is an exploded view of the power unit and the attachment showing the interengageable parts for supporting and drivably connecting the attachment on the unit;

Fig. 2 is a vertical longitudinal section through the attachment;

Fig. 3 is an end view of the attachment as seen from the right-hand end of Fig. 2;

Fig. 4 is a fragmentary sectional view showing the arm swung upwardly with the driving gears disengaged, and Fig. 5 is an elevational view of the driving gears showing the teeth tapered to facilitate smooth engagement.

Referring to the drawings, the power unit 10 which is the subject matter of the previously mentiond application, has in one wall near its top a pair of laterally spaced openings 12 and 14. The opening 12 contains within it a rotating driven shaft 16, the end of which is spaced rearwardly from the mouth of the opening and has a coupling slot 18 in it. The opening 14 has rearwardly of its mouth a cylindrical bearing surface 15 and at its bottom a keyway 20. The attachment 22 has an articulated mounting bracket or housing consisting of lower and upper parts 24 and 25. The lower part 24 in a vertical plane is generally rectangular in shape (Fig. 3) and has spaced front and rear walls 26 and 28 (Fig. 2) in which are bearings supporting for rotation a coupling shaft 30, a portion of which extends rearwardly from the wall 28 and has on it a driving tongue 32, adapted to be engaged within the driving slot 18 at the end of the shaft 16. The rear face of the wall 28 is contoured to complement the wall of the power unit so as to provide a bearing surface between the bracket and unit which will maintain the shaft 30 in alignment with the shaft 16. Laterally spaced from the coupling shaft 30 is a cylindrical stud or boss 17 fastened to a laterally projecting part 19 on the rear wall 28. The stud has on its underside a key 21 (Figs. 1 and 3) adapted to slide in the keyway 20. As thus constructed the attachment is adapted to be mounted on the unit by thrusting the coupling shaft 30 and the stud 17 into the respective openings 12 and 14 to engage the driving tongue 32 with the driving groove 18 and the key 21 with the keyway 20. The stud 17 serves to prevent rotation of the attachment about the axis of the drive coupling and provides the primary support for the attachment.

The coupling shaft 30 has fast to it a gear 34 (Fig. 2) which is located within the housing 24. At the top of the lower part 24 are a pair of spaced ears 36 (Fig. 3) having horizontally arranged, threaded holes. The upper part 25 is pivotally mounted on the pins 38 fixed in the holes and has projecting forwardly from it a hollow arm 42 which terminates at its distal end in a head 44 (Fig. 2). The arm is held at right angles to the bracket 26 by engagement of the lower edge of the rear wall of the upper part 25 with a shoulder 43 at the upper end of the rear wall 28 of the lower part 24. Thus while the arm is limited in its lowermost position to a horizontal position projecting laterally from the bracket it can be swung upwardly on the pins 38.

There are aligned bearings 46 and 48 in the arm in which is journaled a horizontal shaft 50, to one end of which is fastened a gear 52 located in the part 25 in mesh with the gear 34, and to the opposite end of which is fastened a beveled gear 54 located within the head 44. Two pairs of rectangularly arranged posts 56 are provided on the underside of the arm and head, the lower ends of which have threaded holes for receiving screws by means of which a cover plate 58 is fastened to the underside of the head and a portion of the arm. A cover plate 58 is substantially rectangular and has formed integral with it a pair of downwardly extending, spaced bearing sleeves 60 in which are journaled hollow shafts 62. The upper end of one of the shafts 62 has on it a gear 64 having spur and beveled portions 66 and 68. The beveled portion 66 meshes with the beveled gear 54. The other shaft 62 has on it a gear 70 which meshes with the spur portion 68 of the gear 64. Rotation of the gear 54, therefore, effects rotation of the hollow shafts 62 in opposite directions. Each of the hollow shafts 62 has an internal annular groove 72 for receiving a spring ring 74 and at its lower end a diametrical slot 76 for receiving the ends of a pin 78 in the shaft 80 of a beater.

As previously pointed out the upper part 25 is pivotally supported by the pins 38 and the axes of these pins 38 are situated above the top of the lower part 24 and lie in a vertical plane passing through the center of the gears 34 and 52 perpendicular to their axes of rotation hence the arm may be swung upwardly beyond 90° so as to incline rearwardly and to rest in this position with the end wall of the upper part engaged with the upper edge 45 of the wall 28. As thus tilted rearwardly the arm will remain aloft without holding until it is restored to its horizontal position. In order to facilitate smooth engagement and disengagement of the gears 34 and 52 the teeth of these gears are tapered as shown in Fig. 5 on their left and right ends respectively.

As thus constructed after the lower bracket part 24 has been mounted on the base it is possible by the pivotal arrangement of the arm 42 on the bracket to lift the arm upwardly to withdraw the beaters from the bowl. As the arm is lifted upwardly the angular movement of its pivoted end slides the teeth of the gear 52 out of engagement with the teeth of the gear 34 (Fig. 4) so that the drive is interrupted and the beater shafts come to rest. The pivotal arrangement of the gears is such that they will become disengaged before the beaters are actually clear of the rim of the bowl, thus eliminating any chance for splattering. By lifting the arm through a vertical position and then tilting it backwardly a little it will remain in a stable position until it is again lowered for use and during this entire time will remain out of operation.

The attachment may very easily be removed from the unit by pulling it directly away from the wall and requires no threaded or clamping attachments.

It should be understood that the present disclosure is for the purpose of illustration only and that this invention includes all modifications and equivalents which fall within the scope of the appended claims.

We claim:

1. A mixer attachment in combination with a power unit having spaced openings, one of which contains a driven shaft, comprising a bracket, a coupling element journaled on the bracket for engagement with the driven shaft in the one opening to effect rotation of the coupling, a second coupling element on the bracket slidably engageable with the other one of the openings and forming the primary support for the bracket, said second coupling resisting turning of the bracket about the axis of the first shaft, an arm pivotally connected to the bracket and normally supported thereby in a horizontal position extending outwardly from the unit, said arm being swingable upwardly from its horizontal position through an angle of more than 90°, a pair of beater shaft sockets mounted at the distal end of the arm, a shaft journaled in the arm with means at its outer end for driving the sockets in opposite directions, and a pair of gears mounted one on the inner end of the shaft and the other on the coupling element within the bracket, said gears being in mesh when the arm occupies a horizontal position and the gear on the inner end of the shaft being movable out of mesh with the gear on the coupling element by lifting the arm away from its horizontal position.

2. A mixer attachment in combination with a power unit having a pair of laterally spaced openings, one of which contains a driven shaft, comprising a hollow bracket, a pair of coupling elements, one of said elements being journaled in the bracket for rotation and having a part protruding rearwardly therefrom for driving engagement with the diven shaft in the one opening and the other which is fixed to the bracket for telescoping engagement with the other of the openings, a gear fast to the coupling element within the bracket, a rigid hollow arm, means pivotally connecting the arm to the bracket for swinging movement about a horizontal axis, means on the bracket supporting the arm in a horizontal position so as to extend horizontally outward from the bracket, a shaft journaled in the hollow arm, a gear fast to the inner end of the shaft, the centers of said gear and the gear on the coupling element lying in vertically spaced position in a common plane perpendicular to the axis of the coupling element, said gears meshing when the arm occupies a horizontal position and being disengageable by upward tilting of the arm on its pivot, a pair of beater shaft sockets at the distal end of the arm and means carried by the outer end of the shaft and the sockets for driving the sockets in opposite directions when the shaft is rotated.

3. A mixer attachment in combination with a power unit having a pair of laterally spaced outlet openings, one of which contains a driven shaft and the other a keyway, comprising a housing having vertically disposed pivotally connected lower and upper parts containing respectively a pair of meshing gears, a coupling element fast to the lower gear projecting rearwardly through the lower part of the housing for driving engagement with the driven shaft in the one outlet, a stud fast to the housing and extending rearwardly in laterally spaced parallel relation to the coupling element for telescoping engagement with the other outlet, said stud carrying a key for sliding engagement with the keyway, a hollow arm extending forwardly from the upper part of the housing in which is journaled a shaft, one end of which is fast to the upper gear, a hollow head at the distal end of the arm into which the outer end of the shaft extends, a pair of vertically disposed beater shaft sockets rotatably mounted at the underside of the head, a pair of meshing gears fast to the respective sockets, one of said gears having a beveled toothed hub and a beveled gear fast to the outer end of the shaft meshing with said toothed hub, and means normally supporting the arm in a horizontal position with the first-named gears meshing, said arm being tiltable upwardly to disengage said first-named gears to interrupt rotation of the beater sockets.

4. A mixer attachment in combination with a power unit having a pair of laterally spaced socket openings, one of which contains a driven shaft, a bracket, a drivable shaft and boss extending from the bracket in laterally spaced parallel relation for telescoping engagement with the socket openings on the power unit, said drivable shaft being rotatable and adapted to be drivably connected to the driven shaft in the one socket when thrust into the socket, and said boss to have bearing contact with the other socket, a pair of spaced ears on the bracket, pins extending through the ears and forming horizontal supports at right angles to the axes of the drivable shaft and boss, an arm mounted on the pins for swinging movement from a horizontal position projecting laterally outward from the bracket, upwardly therefrom, beater shaft retaining sockets at the distal end of the arm and means for drivably interconnecting the beater shaft sockets with said drivable shaft on the bracket including a first gear on said rotatable shaft, and a second gear on the arm in mesh with the first gear, said second gear having its center located at the intersection of a vertical line passing through the center of the first gear and a horizontal line coinciding with the axes of the pivot pins.

5. A mixer attachment in combination with a power unit having an upright pedestal in which is a pair of laterally spaced socket openings, one of which contains a rotating drive shaft, a bracket member having articulated upper and lower parts, the lower one of which has protruding therefrom a drivable shaft and a boss which are telescopically engageable with the socket openings, said drivable shaft being drivably connected to the power unit by engagement with the drive shaft therein, a gear in the lower part fast to the driven one of the shafts, an arm fast to the upper part having a downwardly facing opening at its distal end, a transmission shaft journaled in the arm, a gear fast to each end of said transmission shaft, the gear at the inner end of said transmission shaft being located in the upper part of the bracket member in mesh with the gear in the lower part, a cover plate over the downwardly facing opening at the distal end of the arm, said cover plate having integral therewith a pair of spaced, vertically extending bearing sleeves, a pair of hollow shafts journaled in the sleeves, a gear fast to the upper end of one of the hollow shafts, and a gear fast to the upper end of the other hollow shaft which has a spur portion meshing with the last-named gear and a bevel portion meshing with the gear at the distal end of said transmission shaft, said hollow shafts containing annular grooves in which are located spring rings for lockably receiving the upper ends of the beater shafts.

6. A mixer attachment according to claim 1 wherein the teeth on the pair of gears mounted on the inner end of the shaft and the coupling element have tapering ends to facilitate smooth engagement and disengagement when the arm is swung into and out of operative position.

References Cited in the file of this patent

UNITED STATES PATENTS

| | | |
|---|---|---|
| 1,864,304 | Hoe | June 21, 1932 |
| 2,086,658 | Ames | July 13, 1937 |

FOREIGN PATENTS

| | | |
|---|---|---|
| 63,349 | Norway | Mar. 17, 1941 |